(12) United States Patent
Hofman

(10) Patent No.: US 9,407,319 B2
(45) Date of Patent: Aug. 2, 2016

(54) FAULT TOLERANT TRANSCEIVER

(71) Applicant: Sital Technology Ltd., Kfar-Sava (IL)

(72) Inventor: Ofer Hofman, Timrat (IL)

(73) Assignee: Sital Technology Ltd., Kfar-Sava (IL)

( * ) Notice: Subject to any disclaimer, the term of this patent is extended or adjusted under 35 U.S.C. 154(b) by 0 days.

(21) Appl. No.: 14/645,743

(22) Filed: Mar. 12, 2015

(65) Prior Publication Data

US 2015/0270870 A1    Sep. 24, 2015

Related U.S. Application Data

(60) Provisional application No. 61/969,271, filed on Mar. 24, 2014, provisional application No. 62/102,800, filed on Jan. 13, 2015.

(51) Int. Cl.
*H04B 3/02* (2006.01)

(52) U.S. Cl.
CPC .................................... *H04B 3/02* (2013.01)

(58) Field of Classification Search
USPC .......... 235/454, 470; 701/37; 327/63, 74, 75; 375/219
See application file for complete search history.

(56) References Cited

U.S. PATENT DOCUMENTS

| | | | | |
|---|---|---|---|---|
| 4,739,276 A * | 4/1988 | Graube | .................. | G01R 31/11 324/534 |
| 6,115,831 A * | 9/2000 | Hanf | ................... | B60R 16/0315 714/43 |
| 6,535,028 B1 * | 3/2003 | Baker | ....................... | H03K 5/19 327/63 |
| 2005/0118977 A1 * | 6/2005 | Drogi | ....................... | H04B 1/40 455/323 |
| 2013/0269424 A1 * | 10/2013 | Jarrell | ................. | G01N 15/1429 73/61.48 |
| 2014/0035628 A1 * | 2/2014 | Oaklander | ........... | H03K 17/063 327/109 |
| 2014/0266010 A1 * | 9/2014 | Newlin | .................. | H02J 7/0052 320/107 |
| 2015/0202939 A1 * | 7/2015 | Stettner | ............... | B60R 21/0134 701/37 |

* cited by examiner

*Primary Examiner* — Allyson Trail
(74) *Attorney, Agent, or Firm* — Manelli Selter PLLC; Edward J. Sternberger

(57) ABSTRACT

Described is a differential data bus system which maintains error free communication despite faults in one of the data bus lines.

13 Claims, 15 Drawing Sheets

FAULT TOLERANT TRANSCEIVER

The present application claims priority from U.S. Provisional patent application 61/969,271 filed on Mar. 24, 2014 and U.S. Provisional patent application 62/102,800 filed on Jan. 13, 2015, both incorporated herein by reference.

TECHNOLOGY FIELD

The present device and method relate to the field of two wire differential signaling communication systems and in particular to methods for maintaining communication during a fault condition in the line.

BACKGROUND

There are several architectures for transmitting information from one electronic device to another. A commonly used architecture is shown in FIG. 1. In this architecture the devices share a common communication structure, often called a data bus or communication bus. Each device connected to the bus can transmit information on the bus, or receive any information transmitted on the bus. In addition the information transmitted on the bus can pass undistorted through each of the devices. The section of the communication bus connecting one device to another may be termed communication bus line or link. The physical medium through which the signal is transported can be an electrical wire or optical fiber. The signal transmitted from one device to another device on the communication bus can be a change in the voltage, an optical pulse, an electrical pulse with an underlying RF (radio frequency) modulation or similar implementations. Examples of such buses are Mil-Std-1553, CAN, FlexRay, RS485, RS42, and others. Since the transmitted signal passes through multiple devices, it is clear that the connection to each device should not cause any changes in the signal. When all devices have at most two bus links connecting the device to another device the bus is called one dimensional bus. If at least one device has three or more bus links to other devices the bus is called a two dimensional bus.

A commonly used communication bus is a two wire, differential signaling communication bus. In this bus there are two parallel communication buses connecting each device. The signal in this bus is the difference between the signal in one bus to the signal in the parallel bus. As an example, if each bus is an electric wire connecting the devices and if the signal is a voltage change in the wire, than in a differential bus, the signal is the voltage difference between the voltages on the two wires. Differential buses are used to overcome certain adverse physical conditions. For example if the bus suffers significant electrical interference, the voltage on one wire can be unpredictable and the bus would not function. However the two wire bus would see the same voltage interference on both wires and the resulting difference would not be impacted by the electrical interference. Hence a two wire differential bus provides better noise immunity. To prevent signal reflections at bus boundaries or at device to bus connection, the bus is designed with a characteristic impedance and the bus termination or connection points have a termination impedance which matches the bus impedance.

State of art differential buses with termination cannot detect a transmitted signal if there is a fault such as a cut or open circuit in one of the wires of the bus. In the case of a fault, the voltage on one line will follow the voltage on the second line due to the termination resistors (resistance) and there would not be the required voltage difference between the lines to indicate that a transmission has occurred. It is desirable to have a transceiver structure which can continue functioning even if there is a fault in the differential communication bus. Examples of a fault are a mechanical cut or other form of disconnect in one of the data bus wires. During the occurrence of such a fault the transmitted data on the data bus would be received with a large number of errors which can reduce the utilization of the data bus to less than 10% of its original capacity. Also, during the occurrence of such a fault the transmitted data on one side of the fault would not pass the fault and reach the units on the other side of the fault. In addition, in the case for self-erupting protocols such as CAN Bus, if one of the two wires is still intact, units transmitting at the same time on both sides of the bus fault would interfere with each other's transmissions. Hence, it is desirable to provide a data bus architecture which can reduce the number of transmission errors in the event of a fault in the differential data bus.

GLOSSARY

"Communication bus"—as used in the current disclosure communication bus means a structure connecting between different devices or modules configured to receive and transmit signals from one or more sources of the signal to one or more devices or modules hosted by the bus.

"Binary data bus"—as used in the current disclosure means a data bus with a set of two voltage levels.

"Bus link or line"—as used in the current disclosure means a continuous electric or optical line extending through two or more devices or modules on the bus.

"Data bus"—as used in the current disclosure means a structure connecting between different electronic devices or modules configured to receive and transmit data from one or more sources of the signal to one or more devices or modules hosted by the bus. The structure could be such as one or more electrical wires of a fiber optics bus.

"Two wire differential signaling communication bus" as used in the current disclosure means a communication bus which is composed of two parallel communication buses where the transmitted signal is the difference between the signals on each of the parallel buses.

"Electrical interference" as used in the current disclosure means a situation where the voltage on a communication line is unreliable due to external electrical fields "Noise immunity" as used in the current disclosure means the ability of the bus to function under adverse physical conditions.

"Differential receiver" or "receiver" as used in the current disclosure is an element connected to the communication bus and detecting the voltage difference between the two wires on the bus.

"Differential transmitter" or "transmitter" as used in the current disclosure is an element connected to the communication bus and creating a voltage difference between the two wires on the bus.

"Transceiver" as used in the current disclosure is an element comprised of a transmitter and a receiver.

"Voltage level"—as used in the current disclosure means a predefined voltage of the data bus line.

"Line impedance" as used in the current disclosure is the characteristic impedance between the two communication bus lines.

"Repeater" as used in the current disclosure is an element which receives a possibly impaired electronic signal and transmits a repaired version of the signal.

"Low voltage level"—as used in the current disclosure means the lower voltage level of a set of two voltages used in a binary data bus.

"High voltage level"—as used in the current disclosure means the higher voltage level of a set of two voltages used in a binary data bus.

"Reference voltage"—as used in the current disclosure means a voltage corresponding to the common voltage among the set of voltage levels of a differential data bus.

"Line voltage signal"—as used in the current disclosure means the time varying voltage level on the data bus line.

"Data signal"—as used in the current disclosure means the difference between the voltage levels on the two data bus lines of a differential data bus.

"Fault condition"—as used in the current disclosure means a fault, electrical disconnect, open circuit, failed connector or other mechanism which prevents current from flowing across the data bus line.

"Voltage control unit"—as used in the current disclosure means a unit connected to the data bus and provides a reference voltage to the data bus.

DETAILED DESCRIPTION OF EXEMPLARY EMBODIMENTS

A typical known communication bus is shown in FIG. 1. This bus includes a number of devices (101, 104, 106, 108, 130, 132, and 134), which are connected to the communication bus (120). Communication bus (120) supports communication between the devices connected to the bus (120). In the course of normal communication bus 120 operation, signals are transmitted along the bus, and through each of the devices (101, 104, 106, 108, 130, 132, and 134), without changes or distortion or with potentially small changes in the signal which meets the defined bounds of the communication bus (120).

The current method also supports accurate diagnostic of a bus fault condition and identifying the fault location by comparing the time duration of the transmitted pulse to the received pulse. The pulse time duration can be measured using a simple and low cost timer-counter which is triggered to start to count at one threshold crossing and triggered to stop the count at a second threshold crossing. The total counts provides the time duration of a key event in the signal. In this manner, this method provides for analysis of complex analog signals by identifying their temporal length using a low cost and simple temporal counter. In the case of voltage transmission along a differential two line communication bus, the duration of transmitted voltage signal is compared to the duration of the received voltage difference.

Figure 1A:
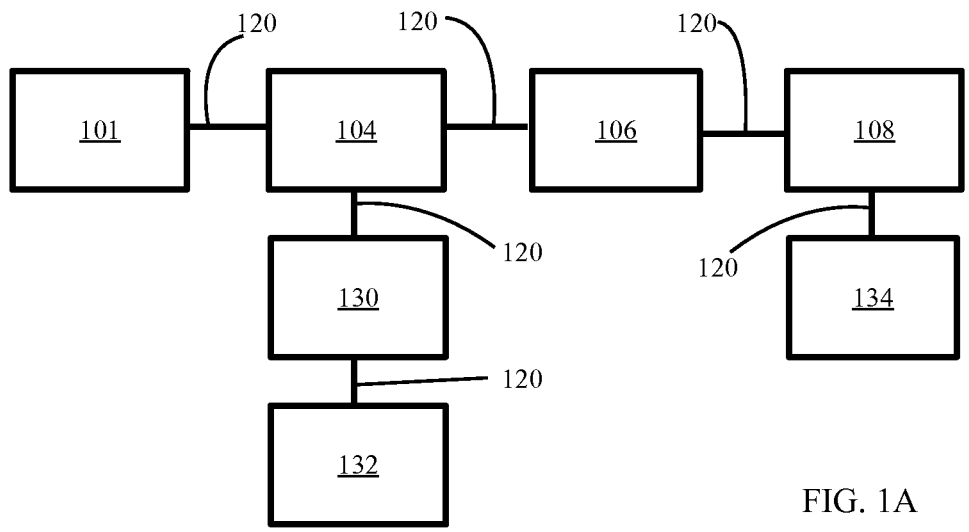
FIG. 1A is an example of existing communication bus architecture for connecting multiple devices.
Figure 1B:
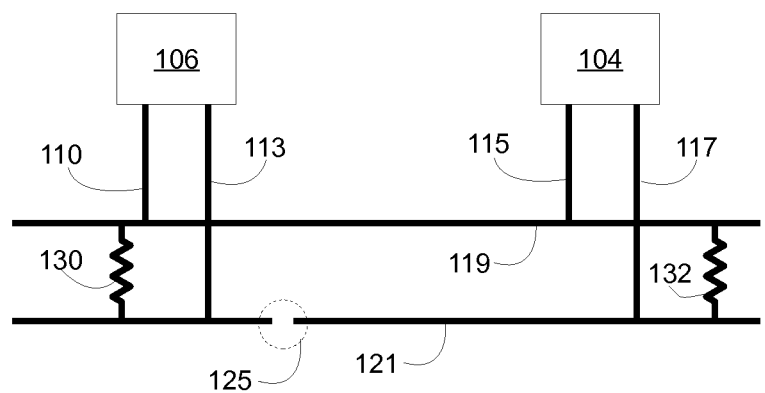
FIG. 1B is an example of a differential data bus connecting electronic devices.

FIG. 1B is an example of an implementation of a differential data bus (119, 121) providing a means to connect electronic devices (such as devices (106, 104) to each other. FIG. 1A is an example of a data bus, where device (101) is connected to the data bus (119, 121) via lines (111, 113) and device (103) is connected to the data bus (119, 121) via lines 115, and 117. The devices (106, 104) transmit data by applying a voltage on the data bus (119,121). In one example, in a differential data bus, the initial line voltage level of data bus line 119 is equal to the initial voltage level of data bus line 121. When the devices (106, 104) transmit data they generate a time varying line voltage signal comprised of a set of voltage levels. A bit is the minimal data information unit. It can have two values a '1' or a '0'. Each bit is defined by a set of two voltages levels which are applied by the device (106, 104) on the data bus (119, 121) for the duration of time corresponding to the bit duration. Termination resistors (130, 132) provide a matched impedance at the termination point of the bus and prevent signal reflections from the termination point of the bus.

Figure 2:
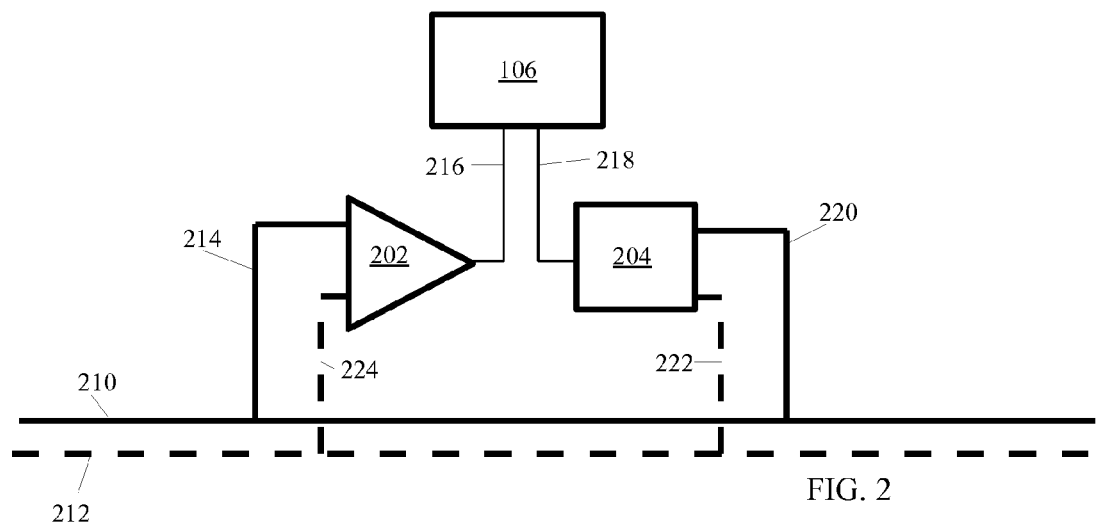
FIG. 2 is an example of state of art transceiver.

FIG. 2 is an example of a known transceiver element connected to electronic device (106). A two wire communication bus (210, 212) is connected to the receiver (202) through connection wires (214, 224). Transmitter (204) is connected to communication bus wires through connection wires (220, 222). The receiver (202) measures the voltage difference between wire (214) and wire (224). If the voltage difference is greater than a predefined value, for example 1 Volt, the receiver indicates to the electronic device (106) on input (216) that the received signal is a '1'. If the Voltage difference is smaller than the predefined value, than the receiver indicates to the device on input (216) that the received signal is a '0'. The receiver (202) can be implemented with a differential amplifier. Where the differential amplifier is configured to provide the bias voltage when the voltage difference at the input is greater than a defined threshold. The electronic device (106) can also transmit signals to the bus (210, 212). If the device is required to transmit a '0' than line (218) indicates to the transmitter (204) that it should not do anything and the voltage difference between (210) and (212) is unchanged. If the electronic device (106) transmits a '1', the transmitter (204) will receive the signal through connection (218) and create a voltage difference between connecting line (220) and connecting line (222). These two lines (220, 222) are connected to the corresponding wire in the communication bus (210 and 212 respectively), and the voltage difference is now between lines (210) and (212). Through these lines the signal will reach all other devices.

Figure 3:
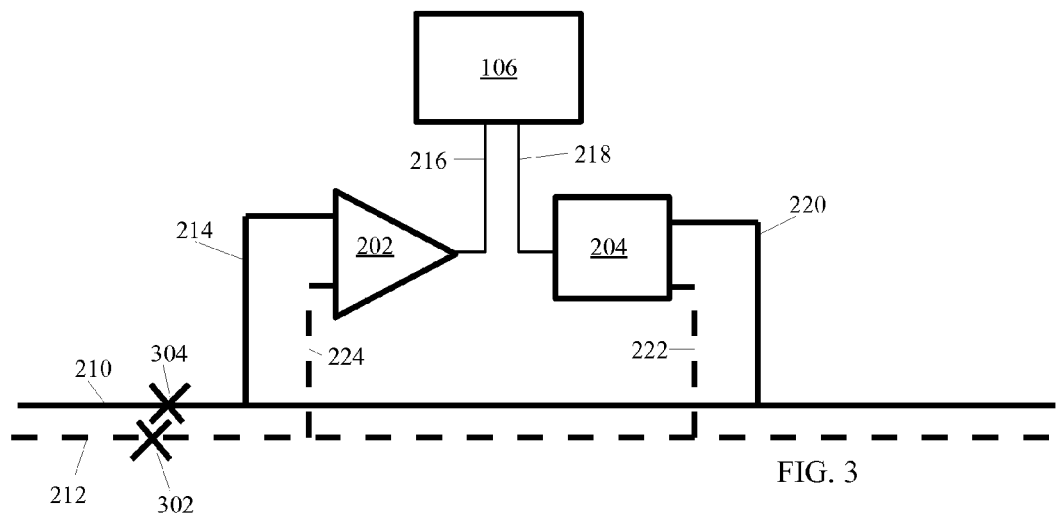
FIG. 3 is an example of a fault in the communication bus.
Figure 4A:
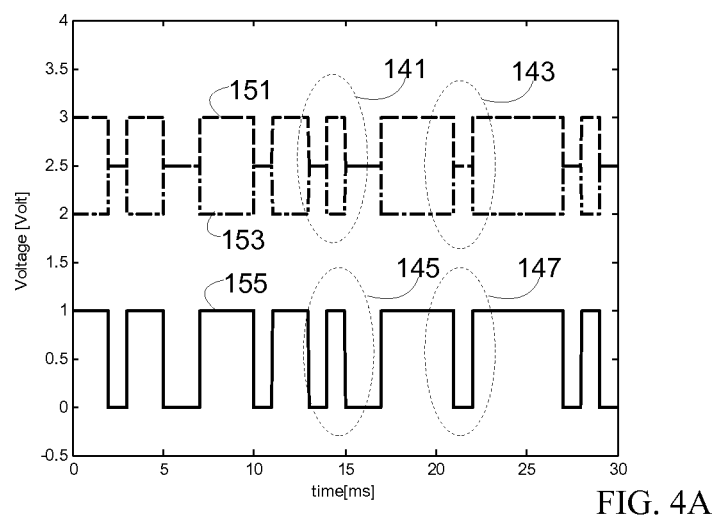
FIG. 4A is an example of the received signals on the data bus.

FIG. 3 is an example of a fault in the communication bus. The known transceiver implementation described in connection with FIG. 2 cannot function in case of a fault (302) or (304) in the line, because after the fault the voltage difference between the lines does not correspond to the voltage difference expected by the receiver (202). FIG. 4A is an example of the line voltage signals (151, 153) on the data bus (119, 121 in FIG. 1B). The resulting data signal (155) is the voltage difference between the line voltage signals (151) and (153). Line (151) is the line voltage signal on one data bus line (119), and line (153) is the line voltage signal on the second data bus line (121). Line (151) comprises two voltage levels. An example of a voltage level is a high voltage level of 3V, and a low voltage level of 2.5V. Examples of other voltage level are described in relevant communication standards such as CAN Bus Spec 2.0, ISO 11898-2. In CAN Bus Spec, the CAN high voltage on a bus line wire (119) is 3.5V and the CAN low voltage on a bus line wire (121) is 1.5V. The signals are named dominant and recessive. Dominant signal, also named '0', is when the voltage difference between the bus line wires (119, 121) is higher than 2V. Recessive signal, also named '1', is when the voltage difference is 0V (zero) and both wires are floating on a common voltage of 2.5V. Line (153) comprises of two voltage levels. In one example the high voltage level of line (153) is equal to the low voltage level of line (151). In another example the high voltage level of data bus line (153) is lower than the low voltage level of data bus line (151). In one example the high voltage level of data bus line (153) is lower by more than 0.5V over the low voltage level of data bus line (151).

The data signal described in FIG. 4A is comprised of multiple bits. In one example a '1' bit is shown in ellipse (145). In one example a '1' data signal is obtained when the voltage level in line voltage (151) is high and when the voltage level in line voltage (153) is low as shown in ellipse (141). In another example a '0' data signal is shown in ellipse (147). In one example a '0' data signal is obtained when the voltage level in line voltage (151) is low and when the voltage level in line voltage (153) is high as shown in ellipse (143).

Figure 4B:
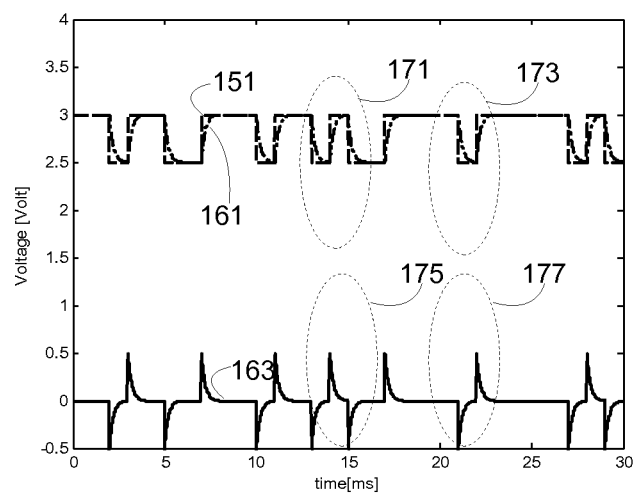
FIG. 4B is an example of the received signals on the data bus .during the occurrence of a fault in the data bus.

FIG. 4B is an example of the line voltage signal and data signal on the data bus (119, 121) during a fault condition. An example of a fault condition is "a disconnect" or absence of contact in one of the data bus wires (121). An example of a fault condition is shown in circle (125) in FIG. 1B. In this example, the line voltage signal on data bus line (119) remains unchanged from its normal operation value and is marked as line (151). The line voltage on data bus line (121) changes from line (153 in FIG. 1B) to line (161 in FIG. 4B). The line voltage signal (161) of data bus line (121) tracks the line voltage signal (151) of data bus line (119). The difference in line voltage signals is due to the resistance and capacitance of the differential data bus line. (163) is the resulting data signal, which is the difference between the line voltage signals (161, 151). The resulting data signal (163) is an ambiguous data signal which does not correspond to a '0' referral number (177) or '0' referral number (175) signal and would cause errors in the receiver of the electronic device (106, 104).

Figure 4C:
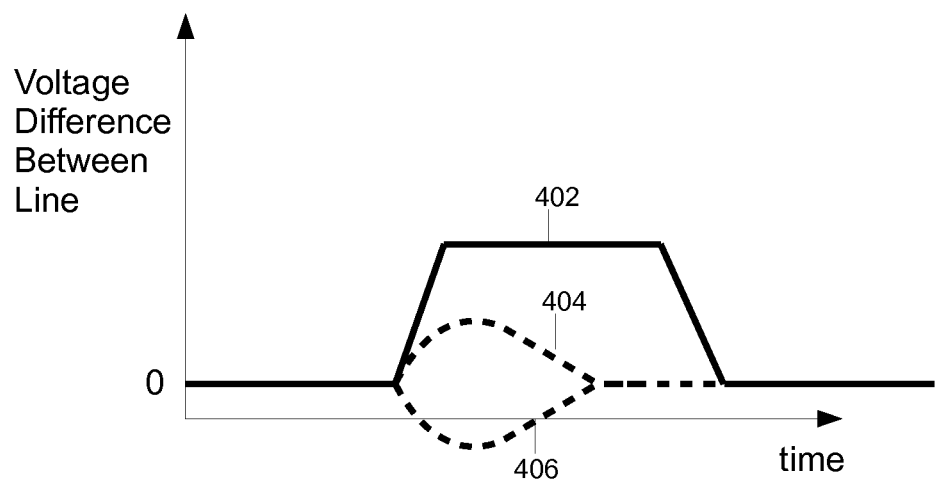
FIG. 4C is an example of the differential signal due to a fault in the bus
Figure 5:
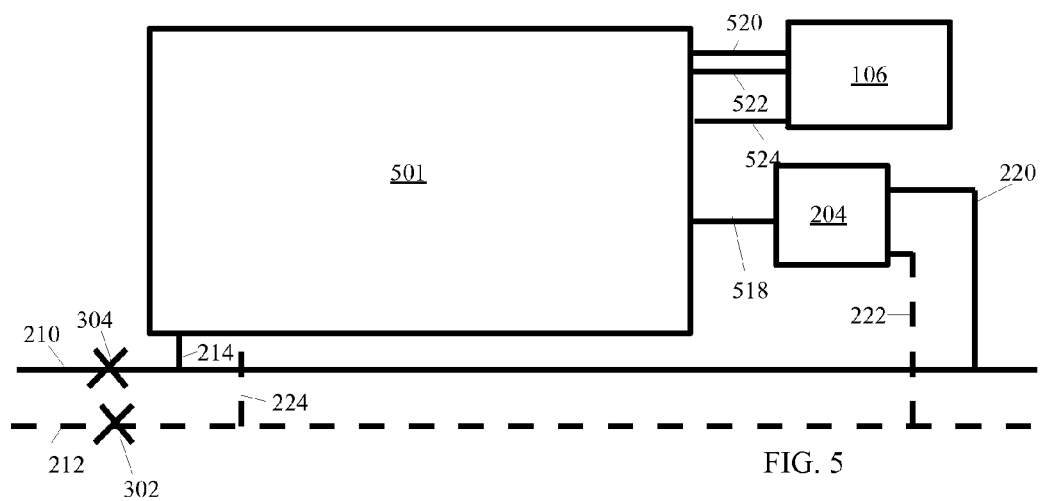
FIG. 5 is an example of a fault tolerant transceiver.

FIG. 5 is an example of a modified transceiver (501) designed to overcome faults in the bus and maintain the communication in the bus even if there is one or more faults in the bus. The modified transceiver comprising; a transmitter configured to transmit voltage signals on a differential two wire communication link; a receiver configured to detect voltage differences transmitted on the differential two wire communication link; a device (106) connected to said transceiver; and wherein the receiver is configured to detect a plurality of voltage differences between the wires of the communication link and the transceiver determines the received signal based on said voltage differences. In one example of use, the modified transceiver (501) detects a plurality of voltage differences as described in FIG. 4C. The transceiver identifies a received signal if the received signal is one of the set of signal differences (402, 404, 406) shown in FIG. 4C. The transceiver (501) determines a signal has not been received if the voltage difference is not any of the voltage differences (402, 404, 406) shown in FIG. 4C.

In some examples of usage, transceiver (501) would be required to inform device (106) of an error condition in the communication link. Line (524) provides such a function by creating a logic connection between transceiver (501) and device (106). As an example, in case of an error, line (524) will become positive, and device (106) will be alerted there is a fault in the communication link. The error indication can be stored in a log file on a hard disk or solid state memory device located in device (106) during the operation of the communication link and devices. The log file may be accessed either through device (106) or through the communication link. The log file would provide an indication for all error conditions in the communication link. An error condition indicates a fault has occurred before the connected device, in this case device (106). Since the transceiver corrects the error signal, any devices after (106) will not register an error. In this manner, devices with errors in the log file indicate an error condition has occurred in the link connecting to the device. Hence a transceiver as suggested with either a logging function in the transceiver or an error indicator, (524) connected to device (106) and providing device (106) an indication there is an error condition in the communication link can be used to the location of fixed and intermittent faults in the communication link.

Figure 6:
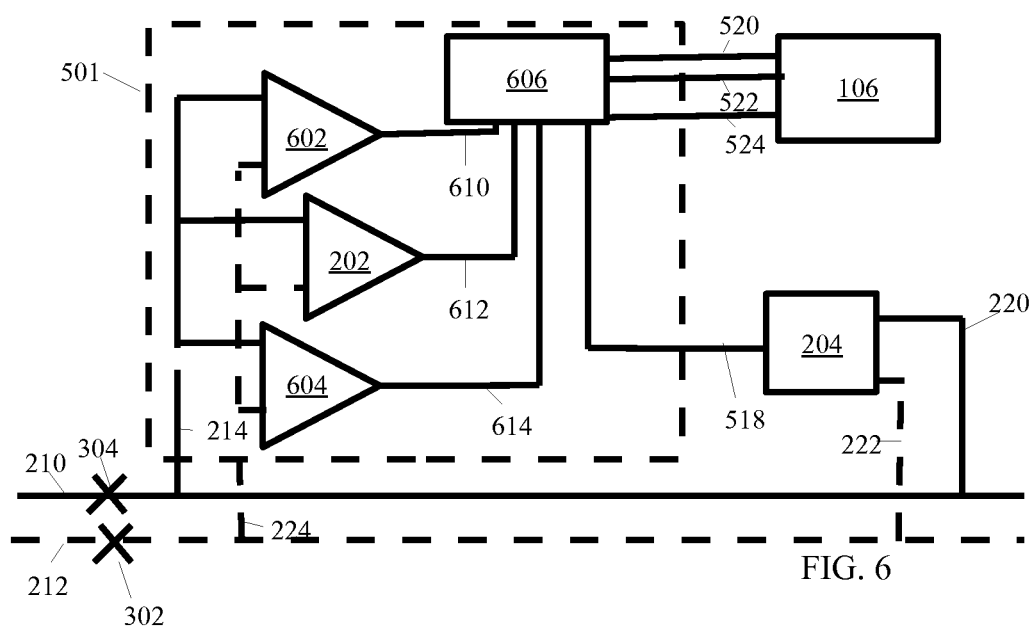
FIG. 6 is an example of an implementation of a fault tolerant transceiver based on three standard receivers and a logic circuit.

FIG. 6 is an example of an implementation of the modified transceiver (501). In this example, the modified receiver is composed of a standard receiver (202) and two additional receivers, (602, 604). The three receivers, (602, 604, 202) are connected to an electronic decision circuit (606). Receiver (602) is designed to detect a smaller voltage difference between lines (214,224) such as signal (402 from FIG. 4C). For example, if receiver (202) identifies a difference of 1 Volt as a signal, than receiver (602) will detect a smaller voltage difference which can be calculated based on the line impedance, for example 0.5 Volt. Receiver (604) is designed to detect a small negative voltage difference between lines (214, 224). This corresponds to a cut (304), in line (210) and the resulting signal (406 in FIG. 4C). Hence receiver comprises at least three receivers (602, 604, 202), each configured to detect a single voltage difference. The electronic decision circuit receives three inputs which correspond to one signal from each of the three receivers (202, 602, 604). If a receiver detects its designated voltage difference, the signal to the electronic decision circuit will be positive. The electronic decision circuit will provide a positive output if any of the detectors provide a positive signal to it. In addition the electronic decision circuit can provide the following states. If the signal from (202) is positive, the bus is functioning normally and the positive signal from (202) is transferred to the device (106). If the signal from (202) is negative, but there is a positive signal from either of the two receivers (602, or 604), then there is fault condition in the bus. The electronic circuit (606) transfers the positive signal from either receiver (602 or 604) via connection (620) to device 106 as in normal operation. In addition the transceiver (501) can register in a volatile or non-volatile memory, the occurrence of a fault for later analysis. Hence the electronic decision circuit determines if a signal is received if the voltage difference in any of the receivers is one of a set of defined voltages. The electronic unit (606), also connects to the transmitter, (204), via line (518). Using this connection, the electronic decision unit, (606), instructs the transmitter, (204) to create a differential voltage signal between lines (210, 212). In this manner the unit functions as a repeater, restoring the original signal to the line after the cut. All devices after the repeater now receive the standard voltage difference. Hence the receiver receives a distorted signal due to a fault in the two wire communication link and the transmitter transmits a non-distorted signal on the two wire communication link. In a similar manner to the example in FIG. 5 an error indicator such as line (524) can provide an indication to the device (106) of an error condition in the communication bus. The device (106) can record the error status for later analysis.

Hence the system described in FIG. 6, provides a transceiver for detecting and transmitting voltage signals on a differential two wire communication link and a device connected to said transceiver, where by the receiver part is configured as three differential amplifiers configured to detect different voltage levels between the wires, a logic circuit connected to device, receivers and transmitter. Furthermore the transmitter is connected to the two wire communication link and transmitting the signals generated by the logic circuit.

In FIG. 6, when the device (106) is required to transmit a signal on the communication bus, it provides the signal on line (522). The electronic circuit (606) transfers the signal to transmitter (204) to create the required signal as a voltage difference. In another example, device (106) can be connected to line (518) and provide the signal to transmitter (204) directly.

Figure 7:
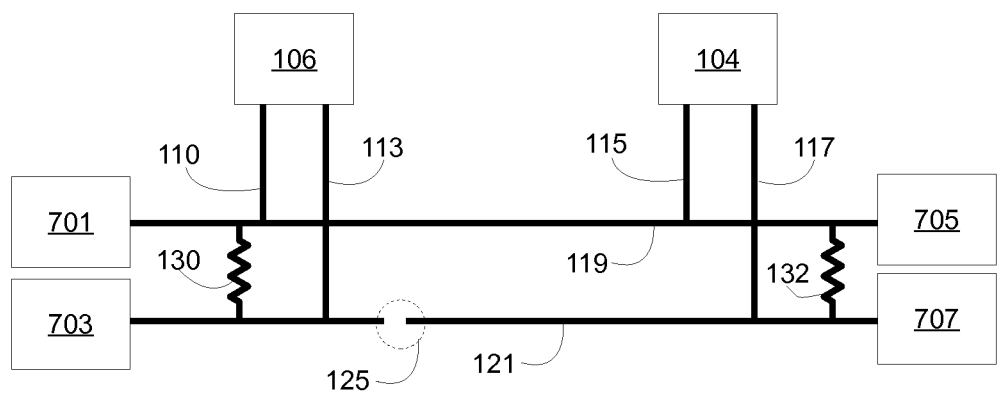
FIG. 7 is an example of fault tolerant data bus.

An alternative approach to provide healing of faults in a data bus is described in FIG. 7. In contrast to the previous example where the signal is reconstructed by a special transceiver, FIG. 7 is an example of a fault tolerant data bus, which maintains the integrity of the signals on the bus even in the case of a fault and without regeneration. The tolerance to faults is achieved by adding voltage control units (701, 703, 705, 707) to the data bus (119, 121). Voltage control units (701, 703, 705 and 707) provide a reference voltage for the data bus (119, 121). In one example the reference voltage is the common voltage level of the set of voltages of the data bus lines (119, 121). In a numeric example, if the voltage levels on data bus line (119) are 2.5V and 3V respectively and the voltage levels on data bus line (121) are 2V and 2.5V respectively than the common voltage is 2.5V. Voltage control units (701, 703, 705, 707) prevent the signal (161 in FIG. 4B) from occurring. In one example, when there is a fault (125) in the data bus, the line voltage signal in faulty data bus line (121) will follow the line voltage signal of the data bus line without the fault (119), as depicted in FIG. 4B. When the line voltage signal of line (121) follows the line voltage signal of (119), the data signal which is the difference between line voltage signal in data bus lines (121) and (119) is reduced and the data bus cannot be used to transmit information. In one example, voltage control unit (707) will prevent the line voltage signal (161 in FIG. 4B) of data bus line (121) from going above the reference voltage.

Figure 8:
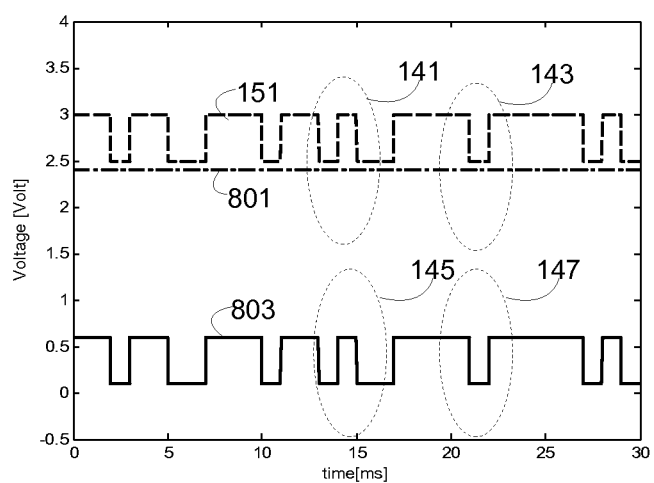
FIG. 8 is an example of the received signals on the fault tolerant data bus connecting electronic devices.

FIG. 8 is an example of the line voltage signals (151, 803) on the data bus lines (119, 121 in FIG. 7). Line voltage signal (151) is the line voltage signal of data bus line (119 in FIG. 7) which does not have a fault. Line (801) is the line voltage signal on data bus line (121 in FIG. 7) after the fault. The maximal voltage level on the line is controlled by unit (707 in FIG. 7) and defined by the reference voltage. The minimal voltage level on the data bus line (121 in FIG. 7) is the original low voltage level of line (121 in FIG. 7). In one example the respective voltages are summarized; high voltage level on line data bus (119 in FIG. 7) is 3V; low voltage level on data bus line (119 in FIG. 7) is 2.5V; high voltage level before the fault condition on data bus line (121 in FIG. 7) is 2.5V; low voltage level before the fault condition on data bus line (121 in FIG. 7) is 2V; reference voltage is 2.5V; high voltage level after the fault condition on data bus line (121 in FIG. 7) is limited to less than the reference voltage by voltage control unit (707 in FIG. 7).

Because of this FIG. 7 is an example of a fault tolerant communication system comprising a differential data bus comprised of two data bus lines; a reference voltage; at least one transmitter configured to generate a line voltage signal on differential data bus; at least one receiver configured to receive a line voltage signal from the differential data bus; and at least one voltage control unit connected to differential data bus; wherein the voltage control unit maintains the voltage in one data bus line above the reference voltage and the voltage in the second data bus line below the reference voltage.

Figure 9A:
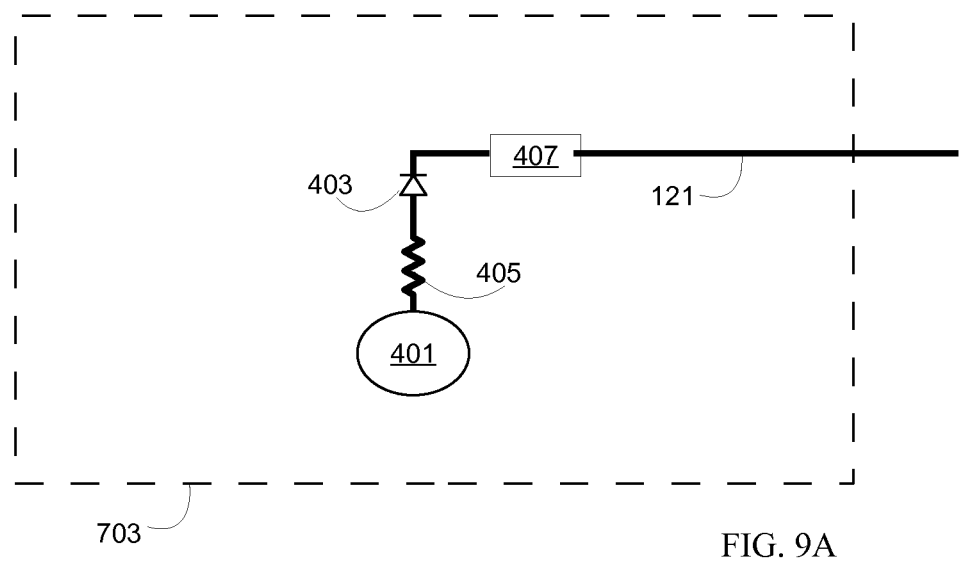
FIG. 9A is an example of termination unit for supporting a fault tolerant data bus.

FIG. 9A is an example of voltage control unit (703, 705, 707, 709 in FIG. 7) supporting a fault tolerant data bus. The voltage control unit (703, 705, 707, 709 in FIG. 7) is composed of a voltage source (401) or voltage regulator, and a diode (403). In one example, the voltage control unit 707 (FIG. 7) is connected to a data bus line (121 in FIG. 7). The voltage control unit (707 in FIG. 7) will prevent the voltage in data bus line (121) dropping below V0. The voltage source (401) provides a voltage which is given by Vs=V0-VD where Vs is the voltage of the voltage source (401), and VD is the forward voltage of the diode (403). In another example, if the voltage is to exceed V0, the diode would be assembled in reverse with the forward terminal facing the voltage source and the voltage source should be able to "sink" the current. For example, the voltage source in this case can be implanted with a Zener diode connected to the Ground. In this example the voltage Vs of the voltage source (401) is given by Vs=V0+VD.

In another example, resistor (405), can be electronically connected in series to the spikes as a result of one of the voltage control unit (703, 705, 707, 709 in FIG. 7) function. Hence, in one example, the voltage control to the diode and a voltage source connected to resistor. In another example, the voltage control unit comprises a resistor connected to a data bus line and a resistor connected to the diode and a voltage source connected to resistor.

In another example, connect unit (407) is an electronic switch which is activated when a fault is detected. In this example, under normal operating conditions the voltage control unit (703, 705, 707, 709 in FIG. 7) is disconnected from the data bus lines (119, 121 in FIG. 7). When a fault condition is detected by devices (106, 104) connected to the data bus, the device (106, 104) which detects the fault operates the connect unit (407) to connect the voltage control unit (703, 705, 707, 709 in FIG. 7) to the data bus line (19, 121 in FIG. 7). When voltage control unit (703, 705, 707, 709 in FIG. 7) is connected to the data bus line (119, 121 in FIG. 7) the data bus (119, 121 in FIG. 7) continues to transmit information despite the fault. In this example, the voltage control unit includes a connect unit configured to connect the voltage control unit to the data bus line (119, 121 in FIG. 7) in the event of a fault condition. The connect unit (407) only connects the voltage control unit of the line with a fault. In one example, when the fault is in line (121) the connect unit would connect voltage control units (203 and 207 in FIG. 7).

Figure 9B:
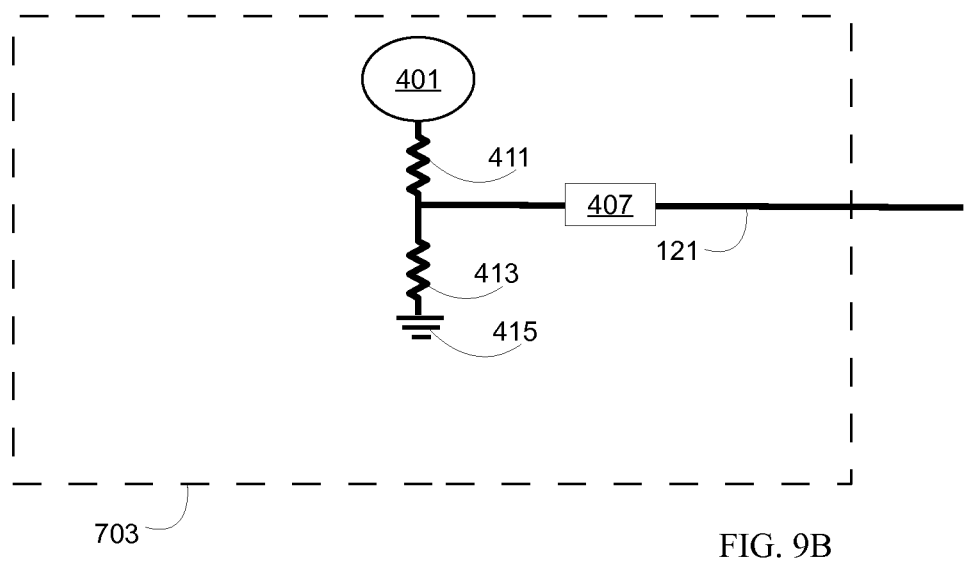
FIG. 9B is another example of termination unit for supporting a fault tolerant data bus.

FIG. 9B is another example of voltage control unit (703, 705, 707, 709 in FIG. 7) supporting a fault tolerant data bus such as RS485. The voltage control unit (703, 705, 707, 709 in FIG. 7) is composed of a voltage source (401) or voltage regulator. The voltage source (401) is connected to the ground terminal (415) through resistors (411, 413). The bus line (121) is connected to the ground terminal (415) via resistor (413) and to the voltage source (401) via resistor (411). The voltage at the bus line (121) is given by the V*R2/(R1+R2) where V is the voltage of the voltage source, R1, is the resistance of resistor (411), and R2 is the resistance of resistor (413). The values of resistors (411,413) are chosen to be similar to the terminating resistors (130, 132 in FIG. 7). In one example resistor (411) is 120 Ohm and resistor (413) is 120 Ohm. In an additional example, resistor (411) is between 100 Ohm and 150 Ohm and resistor (413) is between 100 Ohm and 150 Ohm. In the case of a fault condition such as a cut (125 in FIG. 7) in line (121), the voltage in line (121) is defined by the resistors (411, 413) and voltage source (401) in the voltage control unit. To sum, a voltage control unit comprises a voltage source (401), and at least two resistors were the voltage source is connected to a resistor, a second resistor connected to first resistor and second resistor connected to a ground terminal, wherein the data bus line is connected to first and second resistor. Switch (407) can be used to connect voltage control unit (703) in the case of a fault.

To understand the operation of the circuit described in FIG. 9B, a review of the voltages at different elements of the circuit is provided. The voltage at ground (415) is 0v. When there is a bus fault 125 on line 121 and the transmitter is beyond the fault the voltage at data bus line (121) is defined by the network of resistors (411, 413 of FIG. 9B, and resistor 132 of FIG. 7). For example, If all three resistors are of the same value, then the voltage at data bus line (121) is ⅓ the voltage of voltage source (401). In an example when the voltage at voltage source (401) is 3V, the voltage at data bus line (121) is 1V. The voltage difference at the inputs of voltage control unit (703) and device (106) are thus 1V. In an example where at (106 in FIG. 7) the differential threshold is 200 mV, then device (106 in FIG. 7) would detect the transmitted data of device (104 in FIG. 7) despite the fault.

Similarly, when device (104 in FIG. 7) transmits the opposite value, for example 3V at line (115 in FIG. 7), and 0v at line (117 in FIG. 7), the voltage at line (113 in FIG. 7) is 2V, providing a 1V difference of opposite polarity.

Symmetrically, when device (106 in FIG. 7) transmits to device (104 in FIG. 7) and there is a cut (125 in FIG. 7) in the line (121 in FIG. 7), electronic device (104 in FIG. 7) would receive the information due to the voltage control circuits (705, 707 in FIG. 7).

Figure 10A:
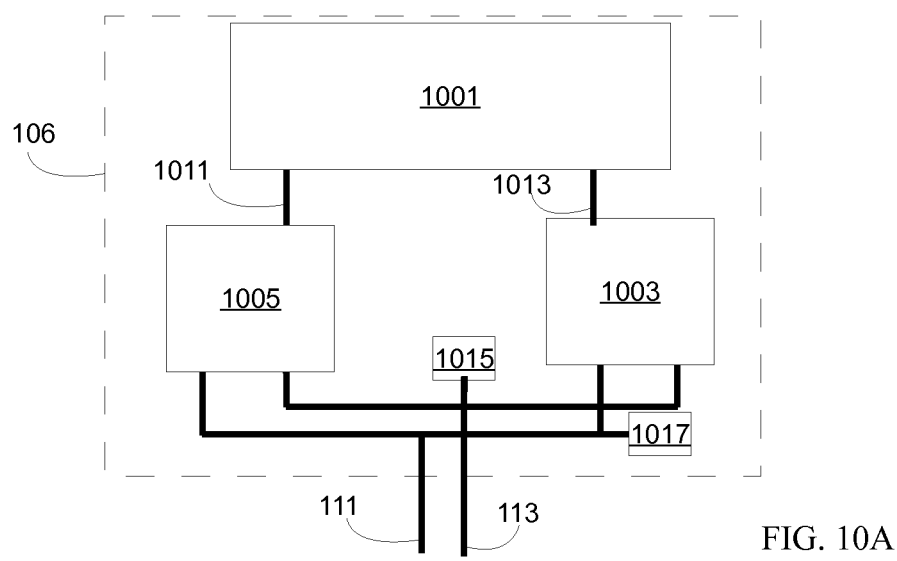
FIG. 10A is an example of an electronic device connected to a data bus.

FIG. 10A is an example of an electronic device such as devices (106, 104 in FIG. 1B), which are connected to a data bus (119, 121 FIG. 1B). In one example the electronic device (106) includes an electronic functional unit (1001), a differential receiver (1003), a differential transmitter (1005), electric connection (1011,1013) between differential transmitter (1005), differential receiver (1003) and electronic functional unit (1001) and voltage control units (1015, 1017). The voltage control units (1015, 1017) perform the same function as voltage control unit (703, 705,707, 709 in FIG. 7). In one example, voltage control unit (1015) is configured to prevent the voltage of line (111) to go below a defined voltage. Voltage control unit (1017) is configured to prevent the voltage of line (113) exceeding a defined voltage.

Figure 10B:
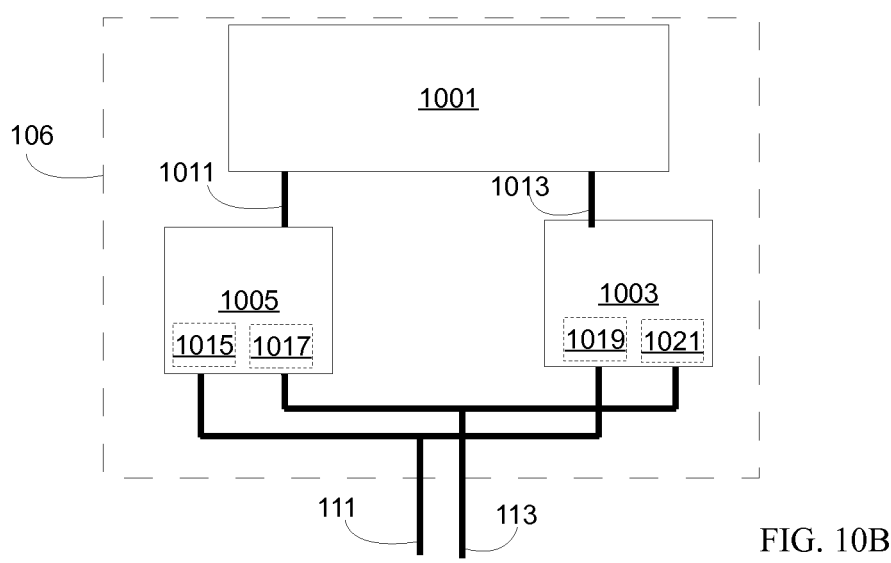
FIG. 10B is an additional example of an electronic device connected to a data bus.

FIG. 10B is an example of an electronic device such as devices (106, and 104 in FIG. 1B), which are connected to a data bus (119, 121 in FIG. 1B). In one example the electronic device (106) includes an electronic functional unit (1001), a differential receiver (1003) a differential transmitter (1005), electric connection (1011, 1013) between differential transmitter (1005), differential receiver (1003) and electronic functional unit (1001). In this example the differential receiver (1003) or differential transmitter or both can include voltage control units (1015, 1017, 1019, 1021). In a further example, differential transmitter (1005), differential receiver (1003) can be realized as one integrated circuit, or one electronic module with embedded voltage control unit (1015, 1017). In one example, voltage control unit (1015) is configured to prevent the voltage of line (111) to go below a defined voltage. Voltage control unit (1017) is configured to prevent the voltage of line (113) exceeding a defined voltage. To sum, voltage control unit (1015, 1017, 1019, 1021) can be embedded in the differential transmitter (1005) or differential receiver (1003).

In another example, when the high voltage difference is more than 1V, and the actual high voltage difference of the transmitter is 1.9V. In the case of a fault in a bus line (e.g. 121 in FIG. 7) and operation of a voltage control unit (703, 707 in FIG. 7) the high voltage difference would be reduced to 1V. The reduced high voltage difference might prevent detection of the transmitted signal. To overcome this problem it is suggested that the transmitters in communication systems using the proposed invention transmit voltage differences that are the maximum allowed for the protocol standard. For example in a CAN Bus system the transmitted voltage difference is 2.5V. In another example when voltage control unit (1015, 1017) is embedded in the transmitter (1005), the transmitter would increase its transmission voltage to the maximal allowed voltage when a fault condition occurs.

The invention claimed is:

1. A transceiver for communication in a differential, two wire communication link, said transceiver comprising:
   a transmitter configured to transmit voltage signals on a differential two wire communication link;
   a receiver configured to detect voltage differences transmitted on the differential two wire communication link;
   an electronic device connected to said transceiver; wherein the electronic device is in communication with another electronic device through the transceiver and the two wire communication link; and
   wherein the receiver receives a distorted signal due to a fault in the two wire communication link and the transmitter transmits a non distorted signal on the two wire communication link.

2. The transceiver according to claim 1, wherein the receiver comprises at least three receivers, each configured to detect a different voltage difference level and wherein the receivers are connected to a logic circuit; and wherein the logic circuit determines that there is a fault in the two wire communication link if one receiver detects a signal and two receivers do not detect a signal.

3. The transceiver according to claim 2, wherein the transmitter is connected to the logic circuit and transmits a signal on the communication link if the logic circuit determines there is a fault in the two wire communication link and irrespective of status of the connected electronic device.

4. A transceiver for communication in a differential, two wire communication link, said transceiver comprising:
   a transmitter configured to transmit voltage signals on a differential two wire communication link;
   a receiver configured to detect a plurality of voltage differences on the differential two wire communication link;
   an electronic device connected to said transceiver; wherein the electronic device is in communication with another electronic device through the transceiver and the two wire communication link; and
   wherein duration of transmitted voltage signals is compared to the duration of the received voltage differences.

5. The transceiver according to claim 4, where a fault condition is determined if the duration of the transmitted voltage signals is different than the duration of the received voltage differences and the transmitter transmits a signal on the communication link if the fault condition is determined in the two wire communication link and irrespective of status of the connected electronic device.

6. A fault tolerant communication system comprising:
a differential data bus comprised of two data bus lines;
at least one differential transmitter configured to generate a line voltage signal on each of the two data bus lines;
at least one differential receiver configured to receive a line voltage signal from each of the data bus lines;
a reference voltage; wherein said reference voltage is higher than the low voltage signal of a data bus line and lower than the high voltage signal of a data bus line;
at least one voltage control unit connected to differential data bus; and
wherein the voltage control unit maintains the voltage in one data bus line above the reference voltage and maintains the voltage in a second data bus line below the reference voltage.

7. The fault tolerant communication system according to claim 6 where the reference voltage is a common voltage level of a set of voltages of two data bus lines.

8. The fault tolerant communication system according to claim 6 where the voltage control unit comprises a diode connected to a data bus line and a voltage source connected to the diode.

9. The fault tolerant communication system according to claim 6 where the voltage control unit comprises a resistor connected to a data bus line, a diode connected to the resistor and a voltage source connected to diode.

10. The fault tolerant communication system according to claim 6 where the voltage control unit comprises a diode connected to a data bus line, a resistor connected to the diode and a voltage source connected to the resistor.

11. The fault tolerant communication system according to claim 6 where the voltage control unit includes a connect unit configured to connect the voltage control unit to a data bus line in an event of a fault condition.

12. The fault tolerant communication system according to claim 6 where the voltage control unit comprises a voltage source, and at least two resistors were the voltage source is connected to a resistor, a second resistor connected to first resistor and second resistor connected to a ground terminal, wherein a data bus line is connected to first and second resistor.

13. The fault tolerant communication system according to claim 6 where the voltage control unit is embedded in the differential receiver or differential transmitter.

* * * * *